Figure 1:
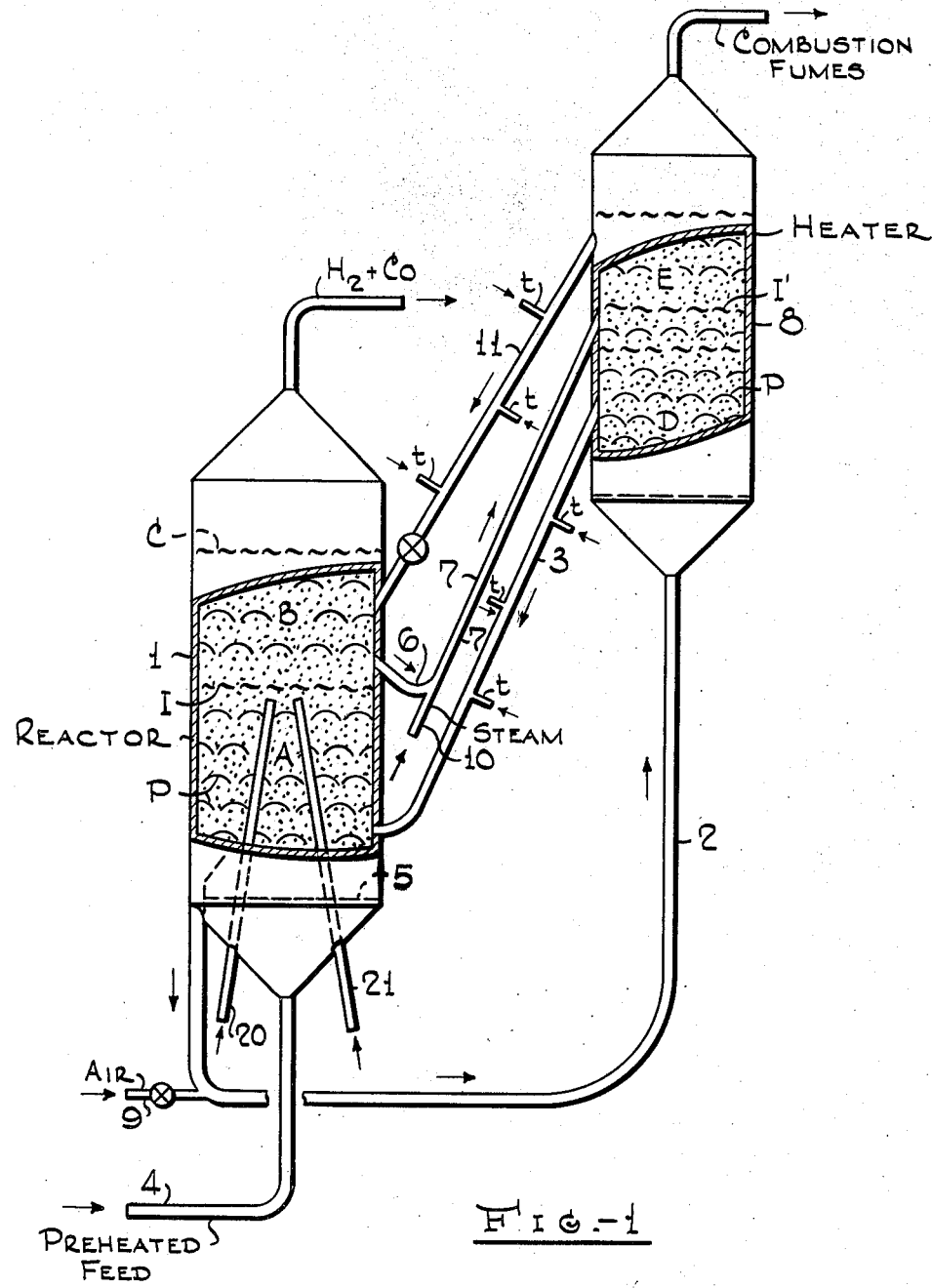

Patented Oct. 19, 1954

2,692,192

UNITED STATES PATENT OFFICE 2,692,192

FLUIDIZED TREATING OPERATION

Homer Z. Martin, Cranford, N. J., assignor to Standard Oil Development Company, a corporation of Delaware Application June 27, 1951, Serial No. 233,731

6 Claims. (Cl. 48—196)

This application is a continuation-in-part of application Serial No. 689,769, filed August 10, 1946, for "Improved Fluidized Treating Operation," now abandoned.

The present invention is concerned with processes relating to the contacting of subdivided fine solid particles and gases. The invention pertains more particularly to processes wherein separate and distinct fluidized phases of fine subdivided solid particles are maintained in a treating zone, and wherein one fluidized phase is caused to flow through a second fluidized phase. It also pertains more particularly to a process of, and an apparatus for contacting solids with upflowing gases in which the gases pass through an enlarged contacting chamber containing a body of subdivided fine solids at a controlled rate to maintain the subdivided solids in a plurality of fluid phases, which phases are in a relatively turbulent, fluidized, ebullient state, and in which process one fluidized phase is caused to pass through a second fluidized phase. My invention and process is specifically directed to an improved method of preparing a mixture of hydrogen and carbon monoxide from methane and/or natural gas.

It has, heretofore, been known in the art to contact gases and solids by passing the gases upwardly through an enlarged treating zone, containing a body of finely divided solids to be contacted, at a controlled velocity to maintain the solids in the treating zone in a quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate.

Fluid operations of the character described for contacting fine subdivided solids and gases have found extensive application in various reduction reactions, polymerization processes, exothermic and endothermic reactions, processes for the carbonization of finely divided coal and similar operations. Specific processes in which the solid fluid technique have been very successfully employed, are processes involving the treatment of petroleum oils, such as catalytic cracking operations, polymerization operations, and the like. The fluid technique has also been successfully utilized in synthesis of hydrocarbons, such as the Fischer synthesis reactions both for the production of synthesis gas itself and for the reaction of oxides of carbon and hydrogen for the production of hydrocarbon constituents containing one or more carbon atoms in the molecule. Thus, while the contacting of finely divided solids and gases in a fluidized bed, as presently practiced, has found extensive application, there are certain inherent limitations in some of the processes as now practiced which have thus far prevented adaptation in many other fields and which have limited its efficiency in many fields in which it is now employed.

In some operations, for instance, as in hydrocarbon synthesis operations, the overall rapid, swirling effect obtained by the circulation of solids through the reaction zone may be undesirable because it is not possible to segregate and separate from the reaction zone, a stream of solids which are anything more than an average mixture of solids contained in the zone. Also, in many processes it is desirable to carry out the operations in truly countercurrent fashion in which the solids pass through the contacting zone in a general direction countercurrent to the flow of the gas. This is particularly true when it is desired to remove spent material from the treating zone rather than an average equilibrium mixture of solids contained in the zone, such as in purification and separation of gases and in the calcination and distillation of solids. Also, in other operations it is of advantage to carry out the process with concurrent flow of solids and gases. Concurrent conditions of operation are unobtainable in carrying out the contacting operation in a free, unconfined fluid bed as presently practiced. Furthermore, there is a practical limit to the depth of the fluid bed which may be used. It has been found that, if the bed is excessively deep, a surging and pounding of the bed results which leads to decreased treating efficiency. It is also desirable in some cases to pass the gases to be treated or contacted successively through two separate fluidized beds in open free communication with each other. It has also been found that in carrying out the contacting of gases and solids in a fluidized bed reactor of the type described, all excess gas, in addition to that which is used to fluidize the solids, tend to agglomerate rapidly into large bubbles which find their way through the bed with imperfect contact with the subdivided solids.

One purpose of my invention is to provide an improved method of, and apparatus for carrying out the contacting of gases and solids in the presence of a fluidized bed of the type described which would not be subject to the limitations mentioned, and which will permit the flowing of one fluidized phase through a second separate and distinct fluidized phase. Another important object of my invention is to provide an improved method of rapidly and effectively separating fractions of subdivided solids of different buoyant properties or particle weights. Another object of my invention is to provide an improved method of maintaining two or more separate and contiguous beds of subdivided solids in open communication with each other wherein one bed is flowing either upwardly or downwardly through a second fluidized bed. Another specific object of my invention is to provide an improved method of contacting gases with a relatively deep bed of fluidized solids. My invention is more specifically directed to improved hydrocarbon synthesis gas production, the scope of which will be understood by subsequent descriptions.

My invention finds specific application in the production of synthesis gases suitable as feed gases for the synthesis reaction discussed heretofore. The synthesis gases comprising hydrogen and carbon monoxide can be produced from hydrocarbons, particularly from methane or from natural gas. The reaction comprises, generally, oxidizing hydrocarbons with a reducible metal oxide. This procedure, per se, is old in the art since there are many disclosures concerned with the use of reducible metal oxides, such as oxides of iron, chromium, copper, nickel, manganese and zinc for the oxidation of hydrocarbons comprising methane to produce hydrogen and oxides of carbon, particularly, carbon monoxide. These reactions are generally conducted at temperatures in the range from about 1400° F. to about 2000° F.

I have now discovered that, providing the character and the type of catalyst is controlled within the reaction zone, that is, the zone where the synthesis gases are produced from hydrocarbons comprising methane, unexpected desirable results will be secured. In accordance with my invention, I control the catalyst within the reaction zone by maintaining therein two separate and distinct phases of fluidized, subdivided solid catalyst particles. In the bottom of the reaction zone, I maintain a suspended fluid bed of finely divided particles of a reducible metal oxide which functions as an oxygen carrier to oxidize hydrocarbons. In the upper section of the reaction zone, adjacent to the lower fluid bed, I maintain a suspended fluid bed of finely divided particles of a suitable reforming catalyst. The two solid phases in my reaction vessel are maintained relatively separate and distinct from each other by virtue of a difference in densities, the lower layer being made up of particles of greater density than those contained in the upper layer. The reducible metal oxides which I choose to use are substantially heavier than the reforming catalysts.

Assuming that FeO is to be used to transfer oxygen to the gas phase, the following reaction represents theoretically the operation:

$$FeO + CH_4 = CO + 2H_2 + Fe$$

However, depending upon the nature of the metal oxide used more or less carbon dioxide and water vapor will be formed along with the carbon monoxide. It is highly desirable to use the water vapor and carbon dioxide in the formation of synthesis gas and this is done by reformation of part of the methane charge with this water vapor and carbon dioxide. It is apparent, therefore, that two reactions are involved, first the oxidation of the methane and secondly, the reformation of residual methane with carbon dioxide and water vapor. The first reaction involves contacting the methane with the metal oxide while the second reaction involves contacting the products of the first reaction with a reforming catalyst.

Other considerations involve the heat balance. Considering first the oxidation reaction, in this process the reduced metal oxide is removed from the bottom of the synthesis gas generator and burned with air in a separate vessel generally operated at lower pressure in order to avoid having to compress the air required more than necessary. This oxidation of the metal by air is carried out at a temperature 100° to 200° F. greater than that existing in the synthesis gas generating zone. The oxidation of the metal oxide causes the liberation of a large amount of heat of oxidation. This heat is absorbed by the metal which is charged to the burning vessel in large excess over and above that theoretically required to oxidize the methane or other hydrocarbon gas used. The hot metal and metal oxide is carried back to the oxidation vessel and its sensible heat content serves to support thermally the reactions therein occurring, together with the heat contained in the feed.

The reaction occurring in the methane reforming zone is endothermic, as indicated, and to support this reaction heat is supplied from the hot solids present in the methane oxidation zone in one modification of the invention. Thus, the reforming catalyst may be caused to flow upwardly through these hot solids to acquire heat in a manner hereinafter more fully disclosed. Furthermore, the reforming catalyst may be withdrawn from the reforming zone and passed through a heating zone also in a manner hereinafter more fully disclosed. A third modification involves internal circulation of the reforming catalyst from the upper to the lower zone where the catalyst acquires heat.

The reforming catalyst may comprise any suitable catalyst, as for example, nickel on magnesia, nickel or Portland cement, or compounds containing manganese and cobalt and the like. Under suitable conditions the following reforming reactions occur:

$$CH_4 + H_2O \rightarrow CO + 3H_2$$
$$CH_4 + CO_2 \rightarrow 2CO + 2H_2$$

In order to carry out my process, I find it desirable to add ½ mol of oxygen by means of the metal oxide to the lower portion of the synthesis gas generation vessel. This quantity of oxygen is sufficient to produce one mol of carbon monoxide per mol of methane charged. To whatever extent that carbon dioxide and water vapor are formed there will be residual unburned methane in the gases leaving the burning zone. It is this residual methane which reacts with the water vapor and carbon dioxide in the reforming zone, although provision is made for adding additional methane directly to the reforming zone.

I have found that it is highly desirable that the reactions be carried out as I have indicated, namely, oxidation of the natural gas in a lower zone followed by reformation of the oxidation products in an upper zone. It is necessary to avoid having oxidation reactions occur in the reformation zone. In other words, it is highly desirable to avoid contacting the carbon monoxide and hydrogen produced in the top zone with metal oxide which might cause degradation of the products to water vapor and carbon dioxide. This is brought out by the following description of experimental work carried out to demonstrate this principle of operation.

A number of operations were conducted in which the feed gases to the treating zone were passed through a mixture of oxidizing and reforming catalyst. In other operations, the feed gases to the treating zone were passed successively through beds of oxidizing catalyst and reforming catalyst. The oxidizing catalyst comprises $Fe_2O_3$, while the reforming catalyst comprised nickel on magnesia. Equal parts by volume of the respective catalysts were employed. The results of these operations are summarized in the following table:

[Feed rate volume gas per volume catalyst per hour=70-100.]

|  | Separate Bed | | | Separate Bed | | | Mixed Beds | | |
|---|---|---|---|---|---|---|---|---|---|
| Temperature | 1,670° F. | | | 1,490° F. | | | 1,580° F. | | |
| Period, Hours | 0-30 | 30-60 | 60-90 | 0-30 | 30-60 | 60-90 | 0-30 | 30-60 | 60-90 |
| Methane Conversion | 92 | 97 | 97 | 81 | 81 | 74 | 70 | 65 | 83 |
| Hydrogen/CO | 1.9 | 2.0 | 2.1 | 2.0 | 2.0 | 2.1 | 2.1 | 2.2 | 3.1 |
| Selectivity $CO_2$ percent | 24 | 2 | 0 | 78 | 4 | 1 | 66 | 52 | 31 |
| Selectivity CO do | 76 | 98 | 100 | 72 | 96 | 99 | 34 | 48 | 43 |
| Carbon do | 0 | 0 | 0 | 0 | 0 | 0 | 0 | 0 | 26 |

From the foregoing it is apparent that it is desirable to pass the feed gases successively through a bed of oxidizing catalyst and then a bed of reforming catalyst rather than through a bed of mixed catalyst.

The process of my invention of flowing one fluid phase through a second fluid phase, in a treating zone, is preferably carried out by the use of solid non-fluidized packing material which is positioned in the treating zone. It is to be understood that my invention will find application in operations in which it is desired to carry out the operation with either concurrent or countercurrent flow of one phase of the powder with respect to the gases. The invention is directed and is applicable to all processes in which solids and gases are contacted, and in which the gases to be treated or contacted are passed upwardly through an enlarged reaction zone containing a body of finely divided solid particles maintained in two phases at a velocity sufficient to maintain the finely divided solid particles in a fluidized, quasi-liquid or ebullient state. My invention is applicable to operations in which the finely divided solids are continuously introduced into the reaction zone and a stream of solid particles is continuously removed therefrom, as well as, to operations in which a body of finely divided solids is maintained within the treating zone.

In accordance with a modification of the present invention, the reaction zone is filled, or partially filled, with packing or dispersing elements adequately spaced to provide a labyrinth of discontinuous passageways in which the gases are in contact with the finely divided solids, which are maintained in a quasi-liquid condition. These dispersing or packing elements prevent the overall swirling or rapid circulation of the solids throughout the full length and depth of the reactor, and also tend to break up and disperse the larger gas bubbles which tend to form. Furthermore, the presence of these dispersing or packing elements provide, among other things, more intimate and better contact between the solids and gases than would be the case where the dispersing elements are omitted.

The size and character of the packing, as well as its employment in the treating zone may vary appreciably. For example, the packing or dispersing elements may be dumped in the reaction or treating zone in a random fashion, or these packing elements may be made to assume predetermined geometric patterns. In cases where it is desired merely to avoid rapid overall recirculation of the solid particles throughout the reaction zone, the packing elements may be so spaced as to avoid extended uninterrupted flow of the gases through the reactor while permitting substantial vertical flow without interruption. Where it is desired to break up the formation of large bubbles and to maintain two phases, the packing and spacing elements may be so arranged as to prevent extended and uninterrupted vertical flow of the gases through the reaction zone. The dimensions and the type of the packing elements utilized may be varied considerably, depending upon the type of the reactor employed, the velocity used, the particular reaction being carried out and the character and particle size of solids being suspended. In general, the packing may vary from a minimum dimension of ¼ inch to a maximum dimension of 12 inches or more. Packing elements of the saddle type, having a maximum diameter of 1 inch to 2 inches (for example Berl saddles), are particularly suitable for most reactors or treating zones. The packing or spacing elements should be shaped and arranged within the reactor so as to avoid extended horizontal surfaces on which the solid particles undergoing treatment can settle and collect.

The reaction zone or treating chamber may have packing elements of different sizes in different vertical sections of the chamber. For example, the upper section of the chamber may be filled with relatively small packing elements and the bottom section filled with relatively coarse packing elements. In some cases it might be of advantage to have the coarse packing at the top and the fine at the bottom. Different size packing in top and bottom of the contacting zone is of particular advantage in effecting separation and classification of subdivided solids, and when it is desired to maintain two separate and distinct beds of fluidized solids in a single reactor.

When the space occupied by the packing is not an important factor, the packing elements may be in the form of solids balls, spheres, cylinders, blocks, bricks and the like. However, where it is important to provide maximum reactor space with minimum volume occupied by the packing or spacing elements, it is preferable to provide elements which give a maximum surface. These elements may, for example, be in the shape of hollow cylinders, U-shaped elements resembling saddles, wire turnings, wire helices and the like. Raschig rings may be used as such. When using wire helices as packing elements, it is preferred to provide burrs or crimps in the wire as base points around the circumference to avoid interlocking of coils. When using saddle shaped elements, the elements should be designed to prevent close nesting of one saddle in another.

The packing or spacing elements may be made of any desired material capable of withstanding the conditions of operation. In cases where the reactor is adapted to carry out catalytic reactions, the spacing elements may or may not have catalytic activity.

In order to successively maintain a quasi-liquid phase of subdivided gases and solids in the passage-ways between the packing elements, the subdivided solids or powder should be of such character as to be able to flow freely down through the interstices of the packing elements without becoming packed or agglomerated in the absence of an upflowing fluid. This quality of free flowing in the interstices of the packing in the absence of a suspending fluid is a function of factors, among which include the density of the subdivided particles, particle size, contacting zone size with respect to length as to width and particle size distribution. Thus, the finely divided solids used in the present invention must be of such particle size distribution so as to be free flowing without the aid of aeration. By this is meant, for example, that if a body of said solids having all sides and the bottom supported, has the support on one side removed, the body will flow out that side in such a way as to leave a substantially, uniformly inclined surface. As pointed out heretofore, the body is free flowing if it will flow downwardly freely through the packing in the absence of aeration without bridging. In general, this characteristic is influenced by the content of fines in the subdivided solids having a diameter less than about 20 microns. Usually, the content of such fines should not be greater than about 12% by volume since a percentage greater than this will render subdivided particles having particle distribution in the range from about 20 microns to 200 microns nonfree flowing. If the subdivided particles are free flowing, it is possible to fluidize the subdivided particles in the interstices of the packing regardless of the relative sizes of the packing, and the particle sizes of the subdivided particles providing the packing is sufficiently large to provide interstices each having a diameter greater than the diameter of the largest particle in the subdivided solids. In general, the packing should be such as to provide interstices having a length as compared to diameter of not greater than 15 to 1. Also, the packing should be at least about 10 times as large as the largest particle to be fluidized.

A further illustration of free flowing subdivided solids in the absence of aeration with respect to its successful fluidization between the interstices of solid nonfluidized packing in a treating zone is shown by the following data. The catalyst used was a silica gel catalyst impregnated with alumina (approximately 87½% silica and 12½% alumina).

| | Operation A | Operation B |
|---|---|---|
| Silica-Alumina Catalyst Micron Size: | | |
| 0–10 | 6.8 | 3.2. |
| 10–20 | 8.8 | 7.3. |
| 20–40 | 19.1 | 24.1. |
| 40–80 | 36.8 | 35.8. |
| 80+ | 28.5 | 29.6. |
| Free Flowing Through Interstices of Packing (No Aeration) | No | Yes. |
| Successful Fluidization In Interstices of Packing | No [1] | Yes. |

[1] Secured surging and channeling.

In these and similar operations, the reactor size with respect to length as compared to width was 15 to 1 or less. The packing comprised commercial packing of the size from about ¼ to 12 inches, generally, in the range from ¼ to about 2 inches. Commercial type packings were used, such as Berl saddles. The velocity [2] of upflowing gas was in the range from about 0.1 to 1.5 feet per second.

As another example, an iron catalyst having a micron size less than 44 was not free flowing in the absence of aeration through the interstices of the packing. This iron catalyst could not be successfully fluidized in a packed zone. On the other hand, an iron catalyst having a micron size in the range from about 100 to 250 flowed freely through the interstices of the packing and could be successfully fluidized.

Also, if a silica catalyst impregnated with alumina, as previously described, has a uniform micron size of about 45, it will neither flow freely between the interstices of packing, nor can it be successfully fluidized.

A further test of a free-flowing body is that if such a body is packed under its own weight in a 60° funnel, it will flow through the funnel freely when released at the bottom. Whether or not small subdivided particles are free-flowing will vary with different materials as described heretofore. However, its free-flowing characteristics in the absence of aeration may be readily determined by a simple test of the character indicated above. If a finely divided solid material is not free-flowing, it can be made so by adjusting its particle size distribution.

My invention is applicable to any operation wherein two fluid phases are maintained in a treating zone, and wherein it is desirable to flow one phase upwardly or downwardly through the other phase. It is particularly applicable in treating zones where the reaction in one phase is exothermic, while the reaction in the other phase is endothermic. Thus, by flowing one fluid phase through the other substantial economies in heat are secured.

Figure 2:
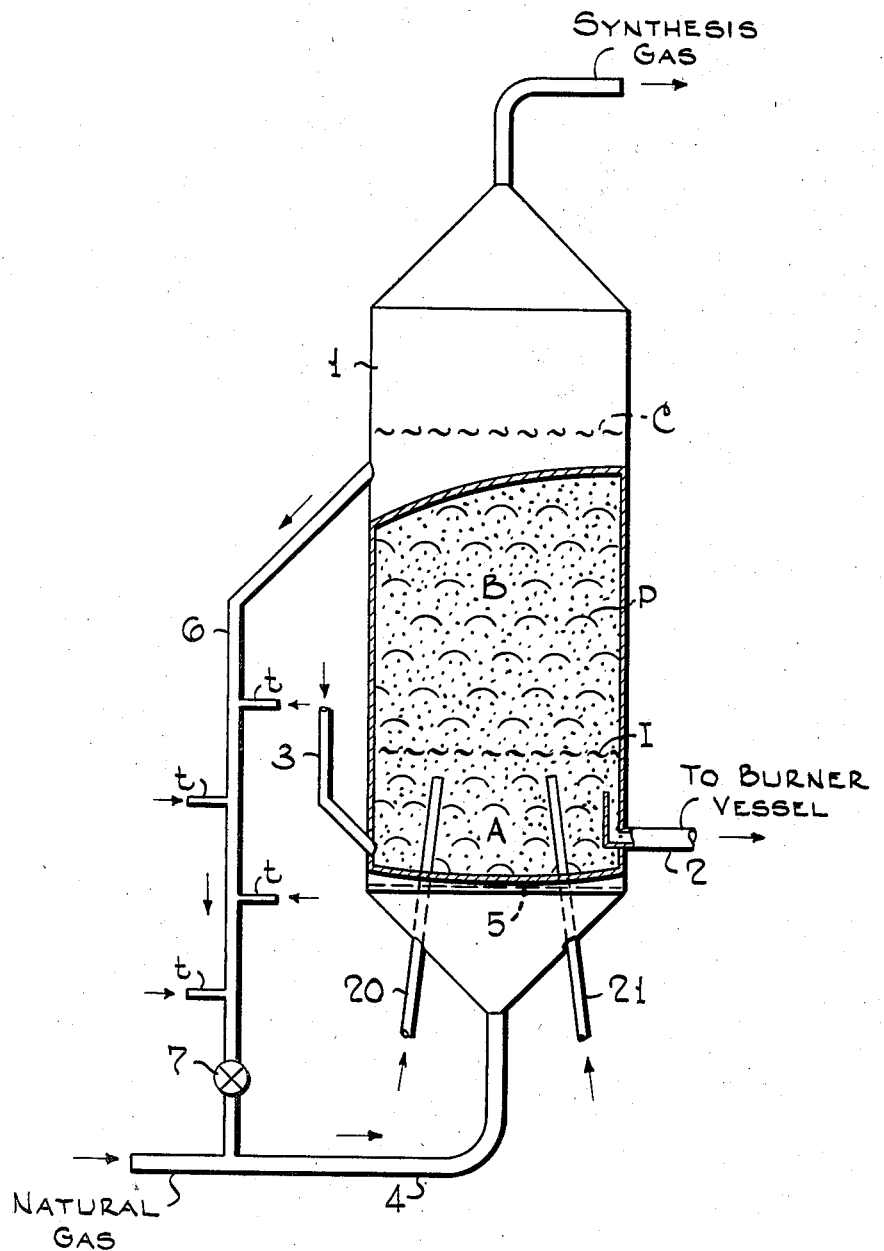

My invention and specific modifications of the same will be more clearly understood by reference to the drawings. Fig. 1 is a view depicting in elevation, partly in section, an apparatus layout adapted to the production of synthesis gas comprising hydrogen and carbon monoxide from natural gases comprising methane; Fig. 2 illustrates a modification of my invention employed

Figure 3:
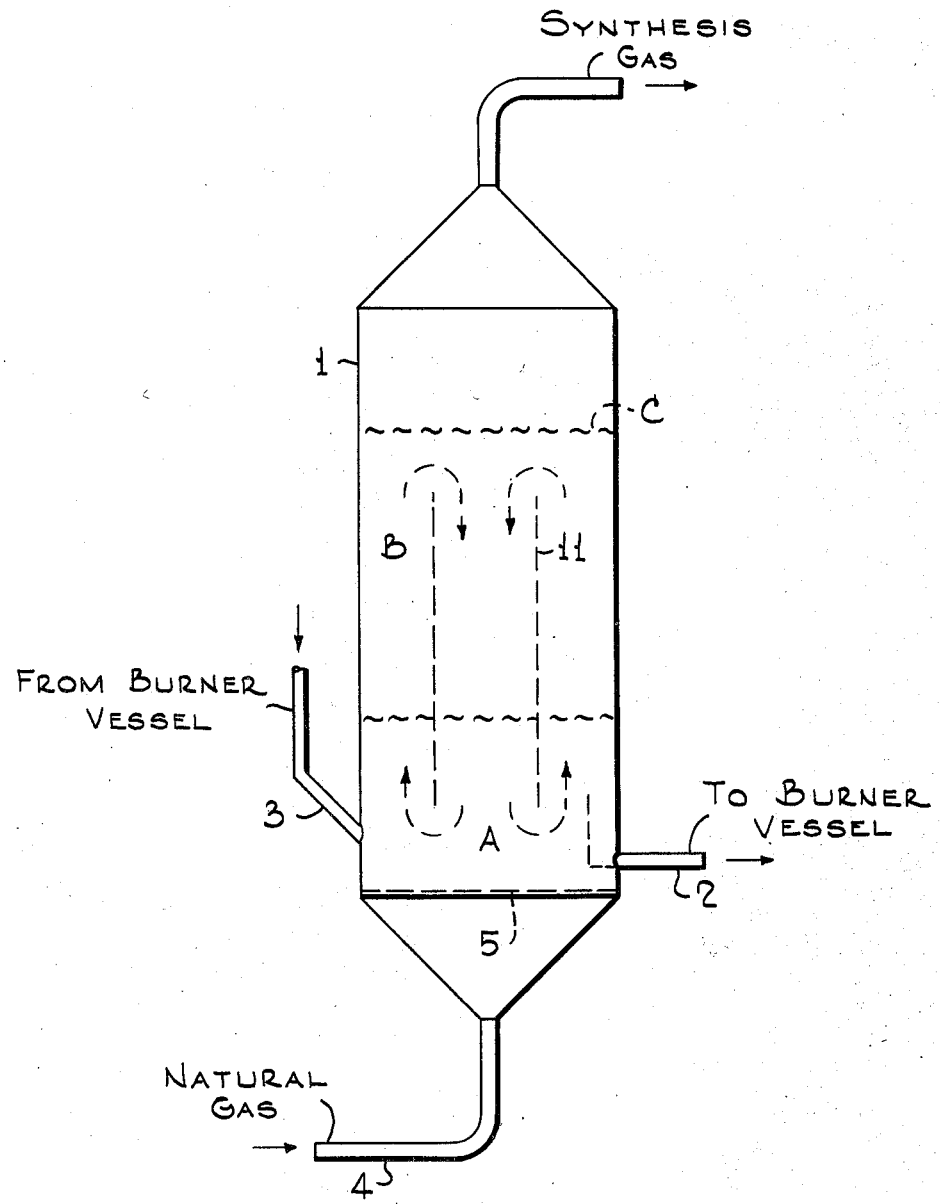

[2] Velocity in the treating zone provided no solids are present.

in a similar process, except that internal circulation of the fluid is secured; and Fig. 3 illustrates a further modification in which the reformer catalyst is circulated externally from the top of the treating zone to the bottom, but without passing through an outside heating zone.

Similar reference characters refer to similar parts throughout the several views.

Referring specifically to Fig. 1, it has been found that it is preferable that the oxygen carrying metal oxide, which may comprise iron oxide, copper oxide, or any equivalent oxide, be in a separate layer from the reforming powder. This powder, as stated, may comprise nickel on a carrier, or other conventional reforming catalyst. In the illustration, the lower fluid zone or phase A comprises the oxidizing metal oxide. This oxidizing agent is maintained in a fluid ebullient state and comprises particles having a micron size generally in the range from about 20 to about 200 microns and higher. Reduced fluid metal oxide is withdrawn from zone A in treating zone 1 by means of withdrawal line or conduit 2. The reduced metal oxide is passed to a burning zone 8, suspended in air injected into line 2 from line 9. In burner 8, the metal in the form of fluidized bed D is reoxidized and returned to zone A by means of conduit or pipe 3 carrying conventional gas taps $t$ into which fluidizing gas is injected for the purpose of causing the solids to flow freely. The natural gas comprising methane is introduced into treating zone 1 by means of line 4 and is distributed evenly throughout treating zone 1 by means of pierced plate or other distributing means 5. The velocity of the upflowing gas is sufficient to maintain the small subdivided particles in zone A in a fluid ebullient state. The metal oxide is introduced in sufficient quantity to supply ½ mol of oxygen per mol of methane in the natural gas. Stated otherwise ½ pound mol of oxygen is supplied for each pound atom of carbon present in the natural gas. A small amount may be supplied in excess of this quantity if desired in order to form some carbon dioxide and water vapor in the products which will supply heat which may be lost by radiation from the reaction vessels. The methane in flowing through lower zone A is oxidized in this zone. The oxidized gases are then passed into the lower level of fluid zone or phase B in which the gases are reformed as hereinbefore described. Zone B contains small subdivided fine solids in a fluid state, and consists, as mentioned, of suitable reforming material such as nickel on magnesia, or Portland cement, or the like. As pointed out, heretofore, it is preferred that treating vessel 1 contain packing elements P spaced apart as indicated throughout zones A and B. The upper level of the second fluid phase, comprising the reforming catalyst, is maintained at level C. The reforming catalyst is withdrawn through pipe 6, carrying gas taps $t$ for fluidizing the catalyst, carried in suspension in an inert gas such as steam introduced through line 10 into 8 where it is formed into a dense, fluidized bed E heated by combustion fumes from bed D and by the heat transfer from the hot solids in D as explained presently. The thus heated reforming catalyst is withdrawn from burner or heater 8 and returned to zone B of vessel 1, via a standpipe 11 carrying the usual gas taps $t$. Thus, the reheated reforming catalyst in this modification is returned to zone B directly without passing through zone A.

It is to be noted that in heater 8 there is an intermediate zone between I and I' wherein there is a mixture of metal oxide and reduced metal oxide and reforming catalyst. Thus, heat is imparted to the reforming catalyst by physical contact with the hot metal oxide in this mixing zone as well as by the hot combustion fumes from zone D.

Treating zone 1 may contain inlet conduits 20 and 21 disposed with their upper ends at the interface I between zones A and B for the purpose of introducing carbon dioxide or methane, or both.

In the modification shown in Fig. 2, the reforming catalyst in zone B is withdrawn through line 6 and discharged into line 4, and thereafter carried in suspension with the natural gas in line 4 into the bottom of treater 1. The more buoyant reforming catalyst passing upwardly through zone A containing hot metal and metal oxide, thus acquiring heat and thereafter passing into zone B with a sufficient heat content to support the endothermic reaction therein occurring in conjunction, of course, with the heat content of the gases passing from zone A to zone B. Otherwise, the operation of the apparatus is similar to that described in connection with the operation of the apparatus of Fig. 1, i. e., the metal in zone A is transferred to a burner vessel for reoxidation, and then returned to zone A via line 3.

Fig. 3 illustrates a modification similar to that described with respect to Fig. 2. However, the layout of Fig. 3 differs from that of Fig. 2 in that instead of external recycling of the reforming catalyst through the lower bed of the oxidizing catalyst, internal draft tube means are provided as shown by element 11, the catalyst circulating in the manner indicated by the arrows.

The reaction may be carried out at various temperature and pressure conditions, as for example, in the range from about 1300° F. to about 2000° F. However, in general it is preferred that the reaction temperatures be in the range from about 1600° F. to 1800° F. Sufficient reforming catalyst preferably is circulated so that the temperature between the two beds does not vary in excess of about 25° F. to 50° F.

Having described the preferred embodiment of my invention, it will be understood that it embraces such other variations and modifications as come within the spirit and scope thereof.

I claim:

1. Improved process for the production of gases comprising carbon monoxide and hydrogen from hydrocarbon gases which comprises passing hydrocarbon feed gases upwardly through a zone containing finely subdivided hot solid particles of a reducible metal oxide maintained in the form of a fluidized bed in a treating zone, said metal oxide particles being maintained at a temperature sufficient to cause the particles to react with the hydrocarbon to produce a gaseous mixture of hydrogen, carbon monoxide, carbon dioxide, steam and unreacted hydrocarbon gases, then passing resulting product gases through a contiguous zone containing subdivided hot solid particles of a reforming catalyst also maintained in the form of a fluidized bed, the said bed of fluidized reforming catalyst being maintained at a temperature sufficient to cause the steam-hydrocarbon and carbon dioxide-hydrocarbon reactions between these components of the aforesaid product gases from the first treating zone to produce additional hydrogen and carbon monoxide, maintaining relatively larger solid non-fluidized packing in said treating zone, and withdrawing product gases containing hydrogen and carbon monoxide from an upper portion of said second bed.

2. Process for the production of synthesis feed gases comprising carbon monoxide and hydrogen from hydrocarbon gases which comprises, passing hydrocarbon feed gases upwardly through a zone of finely subdivided solid particles of a reducible metal oxide maintained in a fluid ebullient state in a treating zone, maintaining the said metal oxide particles at a temperature sufficient to cause the particles to react with the hydrocarbon to produce a gaseous mixture of hydrogen, carbon monoxide, carbon dioxide, steam and unreacted hydrocarbon gases, then passing said gases through a zone of more buoyant, finely subdivided particles of a reforming catalyst maintained in a fluid ebullient state adjacent to said metal oxide in said treating zone, said reforming catalyst being maintained at a temperature conducive to reforming to cause the steam-hydrocarbon and carbon dioxide-hydrocarbon reactions between these components of the aforesaid product obtained from the first zone to produce additional quantities of hydrogen and carbon monoxide, maintaining relatively larger solid non-fluidized packing in said treating zone, withdrawing treated gases from the top of said treating zone, withdrawing reforming catalyst from the top of said treating zone and introducing said reforming catalyst into the bottom of said treating zone below the interface level of said zone of reducible metal oxide and said zone of reforming catalyst, whereby the more buoyant reforming catalyst flows upwardly between the interstices of said packing and through the zone of said reducible metal oxide.

3. Process as defined by claim 2 in which said reducible metal oxide is an oxide of a metal selected from the group consisting of iron, cobalt and nickel.

4. Process as defined by claim 2 wherein the reducible metal oxide is an oxide of a metal selected of the group consisting of iron, cobalt and nickel, and wherein the temperature in the treating zone is maintained in the range from about 1600° F. to about 1700° F.

5. The method set forth in claim 1 in which both the reforming catalyst and the reducible metal oxide are withdrawn from the treating zone, transported to a burning zone and therein separately heated and thereafter in the reheated state separately returned to the respective beds from which they were withdrawn.

6. The method of forming a gaseous mixture containing carbon monoxide and hydrogen which comprises providing a conversion zone containing a fluidized bed of powdered iron oxide and above that a second separate contiguous fluidized bed of a powdered reforming catalyst, both beds being disposed within the same generally confined space, feeding a gas predominately methane to a lower portion of the first named bed and causing it to flow therethrough at a rate sufficient to maintain the said first named bed in a fluidized state, thereafter permitting the product from the first named bed to flow through the second named bed containing reforming catalyst at a rate sufficient to maintain the bed of reforming catalyst in a fluidized state, maintaining the temperature of the bed containing the reducible metal oxide at temperatures effecting oxidation of the said methane, causing the formation of a gaseous mixture of hydrogen, carbon monoxide, carbon dioxide, steam and unreacted hydrocarbon gases and resulting reduction of the said metal oxide by withdrawing reduced metal oxide, charging it to a heating zone where it is contacted with an oxygen-containing gas to reoxidize at least a portion of the reduced metal oxide and impart heat to the remainder and returning the thus reoxidized and reheated metal oxide to the fluidized bed of reducible metal oxide, maintaining reforming temperatures to cause the steam-hydrocarbon and carbon dioxide-hydrocarbon reactions between these components of the product of the first named zone to produce additional hydrogen and carbon monoxide in the bed of reforming catalyst at least in part by withdrawing reforming catalyst from the fluidized bed thereof, charging it to a heating zone where it is contacted with hot gases in order to increase its heat content and thereafter returning the reheated reforming catalyst directly to the fluidized bed of reforming catalyst, and recovering from another portion of the bed of fluidized catalyst a product containing hydrogen and carbon monoxide.

References Cited in the file of this patent

UNITED STATES PATENTS

| Number | Name | Date |
| --- | --- | --- |
| 2,453,874 | Sweetser | Nov. 16, 1948 |
| 2,550,742 | Welty | May 1, 1951 |
| 2,631,094 | Symonds | Mar. 10, 1953 |